United States Patent

[11] 3,561,589

[72] Inventors Daniel C. Larkin, Jr.
  Orchard Lake;
  Edwin C. Fuller, Dearborn Heights; Stanley W. Prenosil, Rochester, Mich.
[21] Appl. No. 823,070
[22] Filed May 8, 1969
[45] Patented Feb. 9, 1971
[73] Assignee The Crest Manufacturing Company
  Southfield, Mich.
  a corporation of South Carolina

[54] ARTICLE HOLDER FOR MOTOR VEHICLE BODY
  9 Claims, 7 Drawing Figs.
[52] U.S. Cl. .................................................. 206/19.5,
  220/18; 224/29
[51] Int. Cl. .................................................. B60n 3/08,
  B60n 3/10, B60n 3/12; B60r 7/00; B65d 25/00
[50] Field of Search .................................... 206/19.5(A)
  19.5 (B), 16, 45.11, 45.19; 220/31 (S.R.), 18,
  20—23.8; 224/29

[56] References Cited
UNITED STATES PATENTS

| | | | |
|---|---|---|---|
| 2,157,990 | 5/1939 | Lux | 206/45.19 |
| 2,804,226 | 8/1957 | Freedman | 206/45.11 |
| 2,880,918 | 4/1959 | Schweikhard | 206/16 |
| 3,110,397 | 11/1963 | Peck et al. | 206/19.5(A) |
| 3,317,097 | 5/1967 | Giordano | 220/31(S.R.) |

Primary Examiner—William T. Dixson, Jr.
Attorney—Burton and Parker

ABSTRACT: A one-piece molded plastic tray having compartments therein adapted to contain articles such as drinking glasses, cleansing tissues, etc. the lower edge portion of which is contoured to be seated upon the longitudinal tunnel hump of an automobile body, with weighted receptacles integrally hinged to opposite sides of the container having sharp prongs on their lower surfaces adapted to engage the tunnel hump covering for retaining the device in position despite forces acting thereon due to sudden starts and stops and cornering of the automotive vehicle.

PATENTED FEB 9 1971

INVENTORS
DANIEL C. LARKIN, JR
EDWIN C. FULLER
BY STANLEY W. PRENOSIL

Burton & Parker

ATTORNEYS

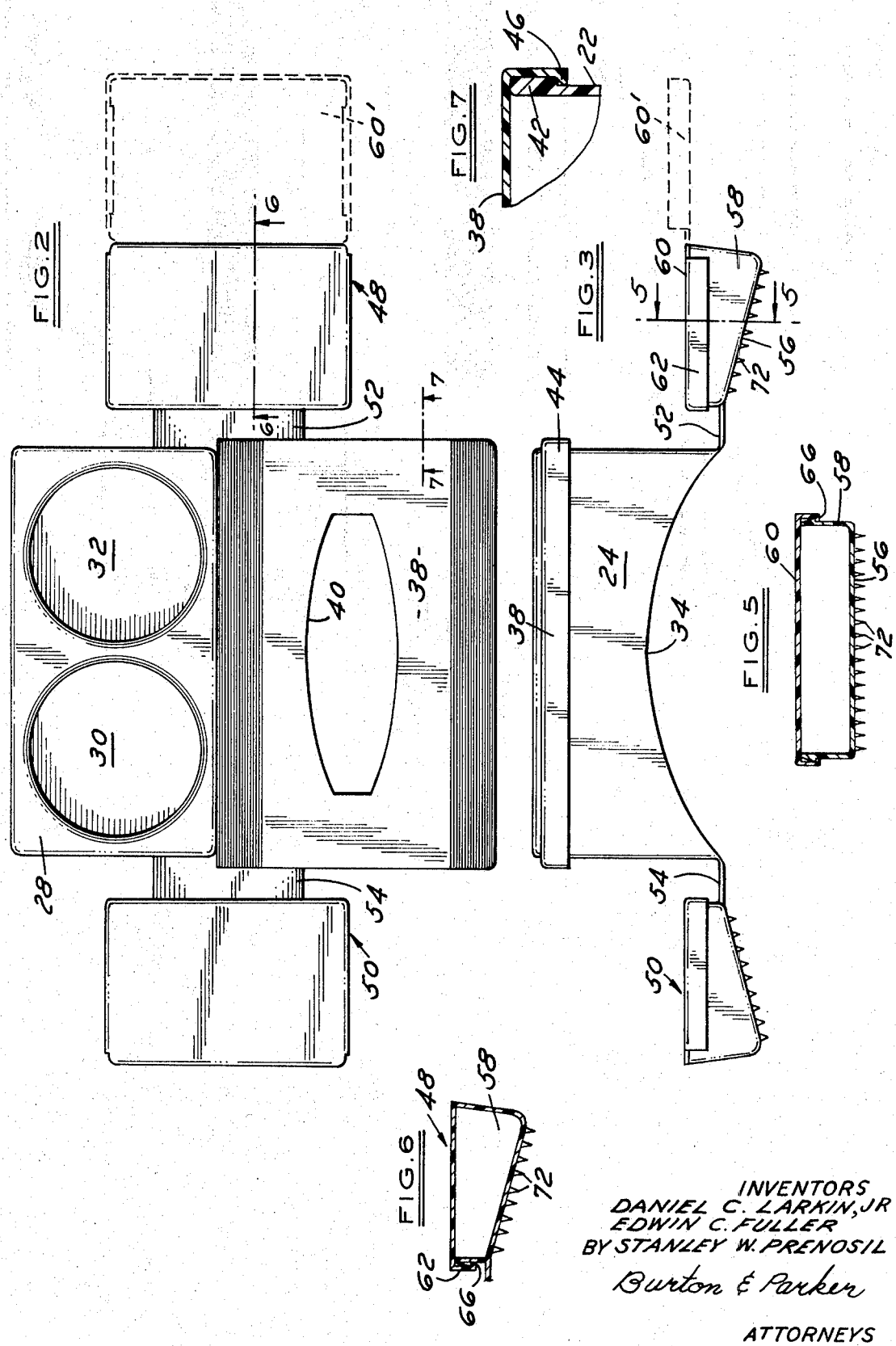

ARTICLE HOLDER FOR MOTOR VEHICLE BODY

BACKGROUND OF THE INVENTION

The invention resides generally in the field of traylike receptacles for containing articles, and more specifically to a device adapted to rest upon the longitudinally extending tunnel hump of an automotive vehicle and be retained thereon against displacement by forces due to acceleration, deceleration and cornering of the vehicle. Many devices of varying design have been provided to hold articles in automobiles, some of them adapted to be affixed in some fashion to the vehicle body itself, while others merely rest upon the car seat, floor or the like.

Some of the most successful and acceptable of the prior art containers in the field have been those disclosed in the U.S. Pats. to Larkin Nos. 3,109,537; 3,223,281, and 3,285,398. These three patents are assigned to the assignee of the instant application. Such prior art devices employ a flexible strap underlying the rigid container portion of the device and having outer end portions forming complementary flaps containing a weighted loose granular material adapted to drape over the tunnel hump on opposite sides thereof and therefore being conformable to varying contours of tunnel hump, with the undersides of the flaps being provided with a sponge rubber facing for frictional engagement of the tunnel hump surface.

While the device embodying the instant invention is likewise adapted to ride the automobile body tunnel hump, as did the devices disclosed in the above-identified patents the instant device employs a different and unique construction. This unit comprises an integral, one-piece plastic molded structure including a boxlike receiver having a pair of weight-receiving receptacles joined to the box by an integral plastic hinge, with the receptacles having an integral hinge cover or lid portion and integrally formed pointed prongs on the other side thereof whereby when the unit is placed on the tunnel hump of an automobile, the weighed members swing by gravity to a position bearing against the surface covering of the tunnel hump with the prongs engaging into the surface to prevent lateral and fore and aft shiftable movement.

Other objects, advantages and meritorious features will more fully become apparent from the following specification, claims and accompanying drawings, wherein:

FIG. 2 is a top elevation of the device shown in FIG. 1 with the cover installed;

FIG. 3 is a side elevation of the device;

FIG. 5 is a cross-sectional view taken along the line 5–5 in FIG. 3; and

Figure 1:
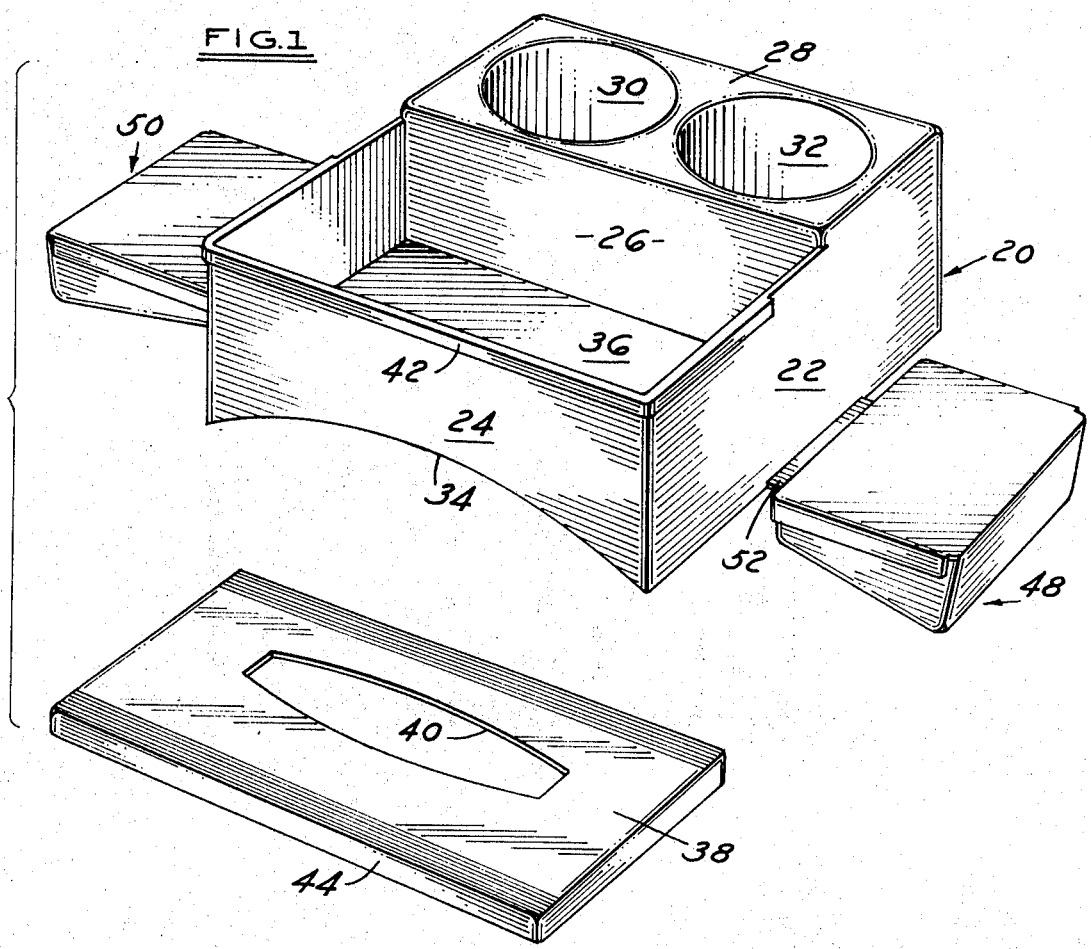
FIG. 1 is a perspective view of a device embodying the invention showing the cover case removed.
Figure 4:
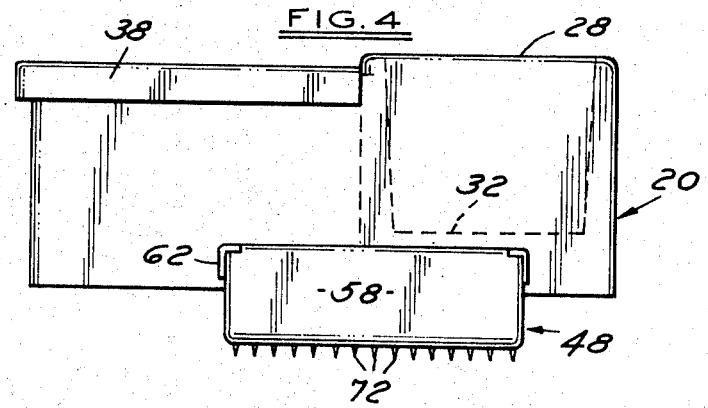
FIG. 4 is an end elevation of the device.

FIGS. 6 and 7 are partial cross-sectional views taken along the lines 6–6 and 7–7 respectively of FIG. 2.

Turning now to the drawings, there is shown a container for use in an automobile comprising generally a molded plastic boxlike receiver 20 having opposed pairs of sidewalls 22 and end walls 24, with an upright median wall 26 extending between the sidewalls 22 to form a generally rectangular compartment in one side of the box adapted to contain various articles or a box of cleansing tissues. The remaining side of the box is partially closed by a top wall 28 having a pair of wells therein 30 and 32 each adapted to retain a drinking glass or the like in an upright position therein. Each end wall 24 exhibits a convex lower marginal edge 34 which is disposed beneath the bottom wall 36 of the receiver to rest upon the convex surface of the automobile vehicle tunnel hump, while the sidewalls 22 likewise project downwardly beyond the bottom wall 36.

A removable lid or cover 38 is provided for closing the top of the article compartment and such lid is preferably provided with a finger opening 40 therethrough shaped correspondingly to the finger opening in the box of cleansing tissues permitting withdrawal of the tissues one at a time through the opening 40 in lid 38. The device may be used with or without the lid 38. A generally rectangular bead 42 extends along the upper marginal edge of one end wall 24 and partially along the upper marginal edges of both sidewalls 22 as shown in FIG. 1. The lid 38 has a depending flange 44 around three sides thereof terminating at its lower end in an inturned bead 46 at least on the two opposite ends of the lid whereby the lid 38 is slidably received over the boxlike receiver with the inturned bead 46 locking under the bead 42 to retain the lid against accidental dislodgement from the container. The lid 38 is of course a separate part, and may be conveniently installed and removed from the container 20 as desired.

A pair of weight-receiving receptacles 48 and 50 are provided on opposite sides of the receiver 20, each of which is joined to the receiver adjacent the lower marginal edge of a sidewall 22 by an integral hinge portion shown at 52 and 54. The receptacles 48 and 50 are of identical construction, and therefore only one will be described in detail. It is to be understood that the entire container comprising the receiver 20, the receptacles 48 and 50, and the hinges 52 and 54 may be, and preferably is, of an integral construction molded in one piece, with the lid 38 being a separately molded piece of plastic. Referring to the receptacle 48, it is preferably of trapezoidal shape in transverse cross section, including a bottom wall 56, upstanding sidewalls 58 and a cover 60. The cover 60 is an integral portion of the receptacle and is swingable from its closed position to an open position shown in dotted outline at 60' in FIGS. 2 and 3. The flexible plastic out of which the receptacle is made permits this one-piece construction with the cover 60 being swingable as shown.

The cover 60 is provided with a depending flange 62 extending around the three sides thereof excluding its hinged edge, with the flange adapted to overlie the upper marginal edges of the corresponding sidewalls 58. The flange has an inturned bead 64 on each of its edges, while the sidewalls 58 of the receptacle are provided with cooperating beads 66 forming shoulders which are engageable with the bead 64 to releasably lock the cover 60 in its closed position shown in solid outline in the drawings. Disposed in each receptacle 48 and 50 is a weighted material which may be of any desired character. The material employed and found to work satisfactorily has been a granular material such as sand 68 which is sealed in a flexible bag 70 which may be preassembled and merely dropped into the receptacles 48 and 50 and the respective covers closed to retain the weighted material therewithin.

The bottom wall 56 of each of the receptacles 48 and 50 exhibits a plurality of projecting pointed prongs or the like 72 which are preferably inclined at a slight angle with respect to the bottom wall 56 directed outwardly away from the receiver 20. These prongs are integrally molded with the receptacle walls. When the container is positioned upon the tunnel hump of a vehicle body such as the tunnel hump shown at 74 in FIG. 3, such hump having a generally convex upper surface 76 and sloping sidewalls 78 and 80, the concave lower marginal edge 34 of the end walls 24 will rest upon the curved tunnel hump surface, and the receptacles 48 and 50 will, due to the weights therein, swing on their respective hinges 52 and 54 into intimate contact with the sloping sidewalls of the tunnel hump. Furthermore, the prongs 72 on the bottom of each receptacle will bite into the surface of the carpet generally employed in automobiles and will become entangled with the carpet loops or fibers to assist in retaining the device stationary with respect to the automobile body even during rapid acceleration, deceleration or cornering movements of the automobile.

In automobile bodies having a fairly drastically curved upper tunnel hump surface, such as shown at 76 in FIG. 3, the lower marginal edges 34 of the end walls 24 will contact the tunnel hump surface and the receptacles 48 and 50 will swing into engagement with the tunnel hump on opposite sides of the receiver 20 with the prongs 56 operating as above mentioned to assist in maintaining stability of the device during movement of the automobile along a roadway. In the event that the upper tunnel hump surface is less severely curved, as shown in phantom at 80 in FIG. 3, the lower marginal linear edges of the sidewalls 22 will engage the tunnel hump, and the receptacle prongs will likewise perform their function to assist in maintaining stability of the device on the tunnel hump surface. Thus it can be seen that the container is utilizable on tunnel humps of various contours, and is constructed in such fashion that it will be adaptable to virtually any tunnel hump configuration without losing any of its stability.

We Claim:

1. A container comprising a boxlike receiver having side and bottom walls and a top opening, a pair of closed complementary weight-receiving receptacles on opposite sides of the boxlike receiver, weighted material in each of the weight-receiving receptacles, and an integral, flexible hinge portion joining each weight receptacle to a respective sidewall of the receiver to form a one-piece structure, with the receptacles being swingable to rest upon surfaces of various configurations and contours.

2. The invention defined in claim 1 characterized in that said sidewalls extend downwardly beyond said bottom wall, said weight-receiving receptacles being joined by said hinge portions to the lower marginal edge of one opposed pair of sidewalls and the remaining pair of sidewalls being concave along their lower marginal edges to fit a correspondingly curved convex surface.

3. The invention defined in claim 1 characterized in that each weight-receiving receptacle includes an open top provided with a lid integrally hinged to a wall thereof, and with the bottom surface of said receptacles exhibiting projecting pointed prongs adapted to engage a surface upon which the container rests to retain the container thereon.

4. The invention defined in claim 3 characterized in that said receptacle lid has a projecting flange adapted to overlie the receptacle sidewalls when the lid is closed, with cooperating projections on the flange and walls forming shoulders interengageable to releasably lock the lid closed.

5. The invention defined in claim 1 characterized in that each weight receptacle contains weighted material in the form of a loose granular material sealed in a flexible bag, with the bag enclosed in the receptacle.

6. The invention defined in claim 1 characterized in that the entire container is plastic and of an integral, one-piece molded construction with said hinge portions being relatively thin, flat straps of plastic and a part of said one-piece construction.

7. The invention defined in claim 1 characterized in that said boxlike receiver includes a pair of compartments separated by an upright wall, one of said compartments having a bottom and enclosing sidewalls and open at the top, with at least two opposed sidewalls having a bead along the upper marginal edges thereof, and a cover for said compartment having a depending flange with an inturned bead for cooperating engagement with said wall bead when the cover is slidably received on the container to releasably retain the cover in place.

8. The invention defined in claim 7 characterized in that said cover exhibits an opening therethrough for the insertion or removal of articles such as facial tissues and the like.

9. A container for use with an automobile body having a linearly extending tunnel hump comprising a boxlike receiver having side and bottom walls defining a plurality of compartments for the storage of articles, a pair of complementary weight-receiving receptacles on two opposite sides of the receiver each joined to the lower marginal edge of a respective wall by a relatively thin flexible strap integral with the receiver and receptacles, each receptacle including a lid swingably joined thereto by an integral hinge portion and cooperating interlocking projections on the lid and receptacle sidewalls to releasably retain the lid in closed position, a plurality of integral pointed prongs projecting from the underside of each receptacle, and a loose granular material sealed in a flexible bag disposed in each of said receptacles, the remaining opposed pair of sidewalls of said boxlike receiver spaced from said receptacles each having a concave lower marginal edge for engagement with the convex contour of said automobile tunnel hump with said receptacles adapted to be freely swingable on said straps to overlie various contours of the tunnel hump and with said pointed prongs engaging the tunnel hump surface to retain the container in the desired position thereon.